March 18, 1958  D. C. YOUNGS  2,827,099
SILOXANE RUBBER GLASS CORD TIRE
Filed July 8, 1955

INVENTOR.
DELMAR C. YOUNGS
BY Robert F. Fleming Jr.

ATTORNEY

United States Patent Office 2,827,099
Patented Mar. 18, 1958

2,827,099

SILOXANE RUBBER GLASS CORD TIRE

Delmar C. Youngs, Midland, Mich., assignor to Dow Corning Corporation, Midland, Mich., a corporation of Michigan Application July 8, 1955, Serial No. 520,673

2 Claims. (Cl. 152—359)

This invention relates to a novel tire for wheeled vehicles comprising siloxane rubber reinforced with coated glass cords.

The increased use of heavy load carrying vehicles and of high speed vehicles is placing an ever increasing burden on tires made from organic rubber reinforced with organic cords. For example, it has been found that tires used on heavy trucks tend to delaminate due to the heat build-up inside the tread and between the plies. This build-up is due in part to the hysteresis effect of organic rubbers. The term "hysteresis effect" has reference to the friction between the rubber molecules which causes internal build-up of heat. Another cause of failure in present tires is due to the fusion or deterioration of the cords when subjected to higher temperatures.

As a result of these difficulties there has been a growing demand for tires which will withstand higher temperatures. Whereas it has long been known that silicone rubber could be utilized at temperatures far in excess of the useful range of organic rubbers, it was not believed possible to fabricate a tire from siloxane rubber. This was due to the belief that the lower strength of the latter precluded its use in tires and was also due to the high cost of the silicone rubber. Furthermore, it was concluded that it would be useless to employ an expensive heat stable rubber as long as it was necessary to use thermally unstable cords.

The problem was how to combine a heat stable rubber with an inorganic cord and produce a usable tire. Prior to this invention it was thought that glass cords would be much too brittle to be useful in tires. The present invention resides in a method of avoiding the difficulty of brittleness in the glass cord.

It is the object of the present invention to provide a novel tire useful at elevated temperatures. Another object is to provide tires which are usable at extremes of high and low temperatures. Other objects and advantages will be apparent from the following description.

This invention relates to a tire comprising silicone rubber reinforced with glass cords, the individual filaments of which are coated with a film of a cured organopolysiloxane having on the average from 1.9 to 2 monovalent hydrocarbon radicals per silicon atom.

The tire of this invention is prepared by coating individual glass filaments with the aforesaid siloxane, spinning the filaments into a cord, embedding the cord in sheets of silicone rubber and thereafter laminating the sheets so formed and molding them into a tire.

For a better understanding of the method of this invention reference should be made to the accompanying drawings in which.

Figure 4:
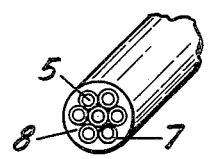
Figure 4 shows a cross section of a portion of a modified cord.

In preparing the tires of this invention it is necessary to first coat the individual glass filaments 5 of the cords 6 with an organosiloxane 7. This can be done by applying to the filaments a fluid organosilicon composition or a solution or suspension of an organosilicon composition and thereafter passing the filaments through a curing zone and then spinning the coated fibers into cords of the desired size. The siloxane may be applied in any convenient manner such as by dipping, spraying, etc. If desired, the spun cord 6 may likewise be coated with an organosilicon composition and thereafter cured so that the entire assembly of filaments acquires an organosilicon coating 8 as shown in Figure 4. The cords are thereafter embedded in uncured or partially cured sheets of silicone rubber which are then laminated together with a tread 9 and formed into a tire in accordance with the conventional method for preparing automotive tires. Preferably the tire should be provided with a wire bead 10 to strengthen the edges thereof.

One of the primary advantages of this invention is that the fabrication of the tires may be carried out in the conventional manner. Hence, the novel products are immediately adaptable for commercial production.

Siloxanes which are useful for coating the individual glass filaments in accordance with this invention include any organopolysiloxane having an average of from 1.9 to 2 monovalent hydrocarbon radicals per silicon atom. These siloxanes serve both as a protective coating and as a bonding agent for the glass filaments. The siloxanes may or may not contain fillers such as silica, aerogels, fume silicas, titania, clay, carbon black and other finely divided inorganic materials. Preferably the siloxanes are cured on the glass filaments by action of an organic peroxide. Suitable peroxides are aromatic acyl peroxides such as benzoyl peroxide and tertiary-butylperbenzoate although any peroxide may be employed if desired.

A typical formulation which is operative for coating the fibers is 100 parts of a 15,000 cs. dimethylpolysiloxane fluid, 100 parts $TiO_2$ and 5 parts benzoyl peroxide. The individual glass filaments can be passed through this mixture and thereafter through a heating zone where they are subjected to temperatures of about 115° C. for 5 minutes. Higher temperatures and shorter times may be employed if desired. Alternatively the coating composition can be a dispersion of a compounded siloxane in a solvent such as 30 parts by weight of 100 parts by weight of dimethylsilicone gum, 35 parts of a fume silica and 2 parts of a peroxide vulcanizing agent in 70 parts by weight xylene. The fibers would be passed through the dispersion and thereafter cured in the normal manner.

Specific examples of siloxanes which are operative for coating the filaments are dimethylsiloxanes, phenylmethylsiloxanes, dibutylsiloxanes, copolymers of dimethylsiloxane and diphenylsiloxane; copolymers of dimethylsiloxane and monomethylsiloxane; copolymers of $\alpha,\alpha,\alpha$-trifluorotolylmethylsiloxane and dimethylsiloxane; copolymers of vinylmethylsiloxane and tolylmethylsiloxane; copolymers of dimethylsiloxane, monophenylsiloxane and octadecylmethylsiloxane and copolymers of chlorophenylmethylsiloxane and dimethylsiloxane.

The cords employed in the tires of this invention are prepared by drawing glass into filaments of, for example, from .0002 to .0004 inch in diameter and then passing these filaments through the organosilicon coating composition. The filaments may then be gathered into strands of, for example, about 200 filaments each and the strands are passed through the heating zone to cure the siloxane coating. This procedure is preferred since the strands are easier to manipulate than the individual filaments. Furthermore when the filaments are gathered before curing, the strand is bound together as a unitary whole thereby giving a stronger ultimate cord. If desired, however, the coated filaments may be cured before gathering into strands. When this is done it is desirable to coat the finished cord as shown in Figure 4.

The strands are then spun into cords. In general, this is done by twisting two or three strands into threads and then twisting two or three threads into cords. Thus, for example, the cords may contain from 800 to 2,000 individual filaments. Larger cords may be employed if desired. All of the manipulative steps used in making the cords can be carried out in the conventional manner for making glass textiles.

Figure 1:
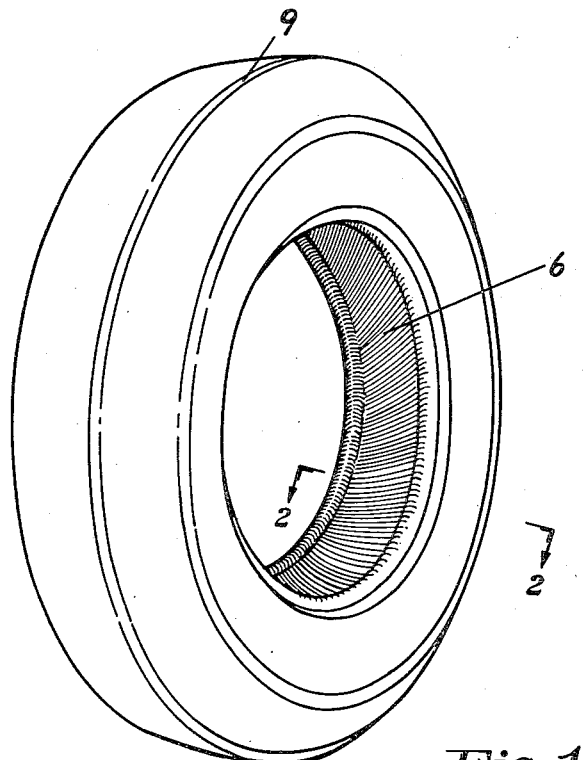
Figure 1 shows a perspective view of a finished tire.
Figure 2:
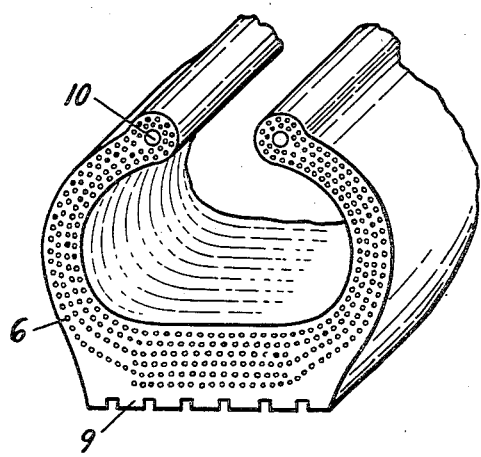
Figure 2 shows a cross-sectional view of the tire along the line 2, 2.
Figure 3:
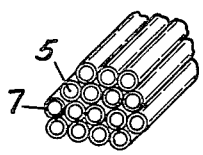
Figure 3 shows a detailed view of a cross section of a portion of cord of Figure 2.

After the cords have been made they are embedded in uncured silicone rubber. Usually this is best done in two steps. The cords are partially embedded in a sheet of rubber stock and the sheet may be partially cured. Additional rubber is then applied to the cord side of the sheet to give a ply of any desired thickness usually about 60 mils. The plies are then laminated together with a tread and the assembly is molded to give a tire of the desired thickness. The tire shown in Figure 1 is a four-ply tire with an overlap beneath the tread to give six plies in that region. It should be understood that tires of any thickness and size can be made in accordance with this invention.

In preparing the plies for lamination the sheets containing the cords are cut on the bias into strips so that the cords run at an angle, usually about 30°, to the long axis of the strip. The strips are then stacked so that in alternate layers the cords run in opposite directions. All of the above laminating and molding steps may be carried out in the conventional manner for making automotive tires.

The term "silicone rubber" as employed herein includes any silicone rubber in which the organic radicals are attached to the silicon through silicon-carbon linkages. These radicals can be any organic radical such as hydrocarbon radicals such as methyl, ethyl, vinyl, allyl, cyclohexyl, octadecyl, cyclohexenyl, tolyl, phenyl, xenyl, benzyl or any halogenated hydrocarbon radical such as trifluorovinyl, chlorophenyl, bromophenyl, trifluorotolyl, perfluorocyclobutyl, pentafluoroethyl and chlorocyclohexyl. The organic groups may also contain functional groups such as hydroxyl, carboxyl, nitrile, amide and the like. Preferably the radicals in the rubber should be methyl, phenyl or fluorinated radicals.

The rubber can contain any of the fillers such as fume silica, silica aerogel, carbon black, metal oxides such as $TiO_2$, $ZnO$ and $Fe_2O_3$ and calcium carbonate normally employed with silicone rubbers. In addition the rubber can contain any additives to improve specific properties such as zinc peroxide, metallic zirconates and mercuric oxide for compression set, oxidation inhibitors and pigments.

The following specific example is illustrative only of the product and process of this invention and many modifications thereof can be made without departing from the scope of the invention. All parts are parts by weight.

Glass filaments of approximately .0002 inch in diameter were sprayed with a dispersion comprising 15 percent by weight of a composition of 100 parts by weight of a dimethylpolysiloxane gum, 35 parts by weight of a fume silicia and 7½ parts by weight benzoyl peroxide in 85 percent by weight xylene. The filaments were thereafter gathered into strands of about 200 filaments each. The strands were then passed through a heating zone where they were heated at a temperature of about 300–400° C. for about 10 minutes to cure the silicone coating.

Four of the resulting strands were spun into a thread and three of the threads twisted into a cord. The finished cord was then passed through a coating composition identical with that above and cured in a similar manner. The coated glass cord was then partially embedded in parallel strands in 25 mil thick sheets of uncured silicone rubber. This rubber (1) had the composition 100 parts of a dimethylpolysiloxane gum, 35 parts fume silica and 3 parts benzoyl peroxide. The sheet was then partially cured and a silicone rubber (2) having the composition 100 parts of a copolymer gum composed of 92.4 mol percent dimethylsiloxane, 7.5 mol percent phenylmethylsiloxane and .1 mol percent vinylmethylsiloxane, 50 parts fume silica, 4 parts ferric oxide and 1 part benzoyl peroxide was calendered on the exposed cords to give a sheet of about 60 mils thick. The sheets were then cut into strips so that the glass cords were at an angle of about 30° to the long axis of the strips. The strips were then laminated into 4 plies together with a tread of silicone rubber (1) and the assembly was molded into a tire 6.70 x 15 inches.

The tire was molded in a standard tire mold at a temperature of 275–365° F. for 25 minutes and then cooled to room temperature before opening the mold.

The resulting tire is suitable for use on wheeled vehicles particularly when operating at high temperatures, i. e. above 150° F. and extremely low temperatures such as —75° C.

That which is claimed is:

1. A tire for wheeled vehicles comprising silicone rubber reinforced with glass cords, the individual filaments of said cords being coated with a cured organosiloxane having from 1.9 to 2 monovalent hydrocarbon radicals per silicon atom.

2. A method of making a tire which comprises coating glass filaments with a siloxane having on the average from 1.9 to 2 monovalent hydrocarbon radicals per silicon atom, curing the siloxane on said filaments, spinning the coated filaments into cords, embedding the cords in sheets of uncured silicone rubber, laminating the sheets together with a thread of silicone rubber and molding the assembly into a tire.

References Cited in the file of this patent
UNITED STATES PATENTS

| | | |
|---|---|---|
| 2,184,326 | Thomas | Dec. 26, 1939 |
| 2,224,274 | Powers | Dec. 10, 1940 |
| 2,390,370 | Hyde | Dec. 4, 1945 |
| 2,392,805 | Biefeld | Jan. 15, 1946 |
| 2,460,795 | Warrick | Feb. 1, 1949 |
| 2,492,129 | Spring | Dec. 20, 1949 |
| 2,504,388 | Braley | Apr. 18, 1950 |
| 2,749,960 | Schwartz | June 12, 1956 |